United States Patent [19]
Heberle et al.

[11] Patent Number: 5,220,580
[45] Date of Patent: Jun. 15, 1993

[54] REMOTE-CONTROL SYSTEM WITH A SPREAD-SPECTRUM TRANSMISSION LINK

[75] Inventors: Klaus Heberle, Reute; Torsten Schuhmacher, Hagen, both of Fed. Rep. of Germany

[73] Assignee: Deutsche ITT Industries GmbH, Freiburg, Fed. Rep. of Germany

[21] Appl. No.: 749,822

[22] Filed: Aug. 26, 1991

[30] Foreign Application Priority Data

Aug. 28, 1990 [EP] European Pat. Off. ........ 90116441.8

[51] Int. Cl.$^5$ .................... H04L 27/30; G08C 23/00
[52] U.S. Cl. ........................................ 375/1; 359/142; 359/146; 380/34; 340/825.72; 340/825.73
[58] Field of Search .................. 340/825.57, 825.72, 340/825.73; 359/142, 146

[56] References Cited

U.S. PATENT DOCUMENTS

| | | | |
|---|---|---|---|
| 4,242,664 | 12/1980 | Lindstedt et al. | 375/1 X |
| 4,703,474 | 10/1987 | Foschini et al. | 375/1 X |
| 4,774,715 | 9/1988 | Messenger | 375/1 |
| 4,875,221 | 10/1989 | Mori | 375/1 |
| 4,995,053 | 2/1991 | Simpson et al. | 375/1 |
| 5,023,943 | 6/1991 | Heberle | 359/142 X |

FOREIGN PATENT DOCUMENTS

| | | |
|---|---|---|
| 0131458 | 1/1985 | European Pat. Off. . |
| 0360476 | 3/1990 | European Pat. Off. . |
| 0377055 | 7/1990 | European Pat. Off. . |
| 2606234 | 5/1988 | France . |

OTHER PUBLICATIONS

Spread-Spectrum Multiple Access Data Loop (National Telecommunications Conference) Mar. 23, 1982; G8.5.1-G8.5.6.

Primary Examiner—Bernarr E. Gregory
Attorney, Agent, or Firm—Thomas L. Peterson

[57] ABSTRACT

A remote-control system with position control includes a spread-spectrum where at least three independent spread-spectrum signals are transmitted. At the receiving end, these signals are separated into their individual components by means of at least three correlators and form the diode signals. Synchronizing means at the receiving end, including further correlators, synchronize the received spread-spectrum signals with associated reference signals with the aid of a phase-locked loop and a control unit.

19 Claims, 4 Drawing Sheets

REMOTE-CONTROL SYSTEM WITH A SPREAD-SPECTRUM TRANSMISSION LINK

FIELD OF THE INVENTION

The present invention relates to an electrooptical transmission link for remote-control signals and, particularly, to such electrooptical transmission links that use spread-spectrum signals for the infrared link.

BACKGROUND OF THE INVENTION

Modern households continue to use increasing amounts of electronic hardware in an effort to promote a higher standard of living. Many electronic devices such as televisions, stereos, VCR players, alarm systems, children's toys and so on use remote-controlled signaling devices in their operation. The result of these electronic devices is an increasingly noisy environment throughout the commonly used remote-control signal frequencies.

One way to prevent interference in remote-control signals is to create narrow-band systems in which each individual device uses a distinct band of frequencies. In theory, if each device used a distinct band of frequencies, no interferences would occur. However, we do not live in a perfect world. Many unrelated remote-controlled devices have overlapping control frequencies. Additionally, random signals produced by such items as fluorescent light bulbs or a neighbor's remote-control transmitter, inevitably cause intermittent interference signals. Consequently, narrow band remote-control devices have inherent disadvantages that adversely affect their operational effectiveness.

The present invention uses spread-spectrum technology to create a remote-control link. Spread-spectrum devices do not use a narrow band. Consequently, spectrum devices are less sensitive to fixed-frequency interference signals or noise signals with emphasized frequency ranges. Additionally, spread-spectrum devices work efficiently when the transmitter energy is low and the frequency of the signal to be transmitted is low, compared with the data rate of the spread-spectrum signal. This characteristic makes spread-spectrum systems even more desirable for household uses because household devices utilize hand-held, low power, low frequency transmitters.

Spread-spectrum technology is not new. The use of spread-spectrum receivers are exemplified in U.S. Pat. No. 4,875,221 to Mori and U.S. Pat. No. 4,774,715 to Messenger. Remote-control systems, utilizing spread-spectrum receivers and transmitters, are exemplified by EP 360,476 to Carlin and EP 131,458 to Diederich.

See also a text entitled "Spread Spectrum Systems" by Robert C. Dixon published by John Wiley & Sons, Inc. (1984). This text gives examples of spread spectrum systems as well as the mathematics and operation of said systems.

The present invention utilizes spread-spectrum technology to create a remote-control system whose control commands are dictated by the relative position between the receiver and the transmitter. Such position controlled spread-spectrum technology is addressed in EP 377,055 to Heberle. However, the prior art has certain disadvantages. Position controlled spread-spectrum transmitters transmit multiple continuous-wave signals. The transmission is a great drain on the battery source of a hand-held transmitter, resulting in short battery life.

The present invention improves upon the prior art creating a position controlled, remote-control system whose electrooptical transmission link is immune to interference. The apparatus uses a low transmitting power and is particularly well suited for hand-held transmitter applications.

It is therefore a principal object of the invention to provide an improved electrooptical transmission link for position controlled, remote-control systems.

It is a particular object to create an electrooptical transmission link that is immune to interference, has low maximum transmitting power and is well suited for hand-held transmitters.

SUMMARY OF THE INVENTION

A signal generating means is present at the transmission end and receiving end of a transmission link. The generating means provides spread-spectrum signals that have identical data sequences but differ in phase between the transmission end and receiving end. A correlator separates the spread-spectrum signals into their individual component signals comparing corresponding transmission end signals with receiving end signals. A synchronization means synchronizes corresponding signals, creating the transmission link between the transmission and receiving end in accordance with the correlated signals.

DETAILED DESCRIPTION OF THE FIGURES

Figure 1:
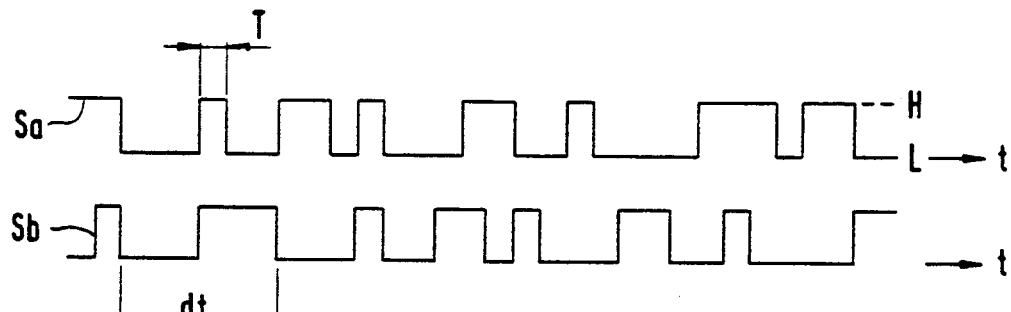
FIG. 1 is a timing diagram of two spread-spectrum signals.

FIG. 1 shows a spread-spectrum signal Sa and a shifted spread-spectrum signal Sb. The data sequences of the shifted out of phase, with respect to signal Sa, by the time interval dt. The smallest pulse dwell time in the two spread-spectrum signals Sa, Sb is represented by the pulse period T which may be as short as 2 microseconds. The spread-spectrum signals have a high state H and a low state L. On average, the signals are in the high state H and the low state L for equal lengths of time. The duration of each high state pulse H or low state pulse L is an integral multiple of the pulse period T. However, the durations themselves are a pseudorandom sequence.

Figure 2:
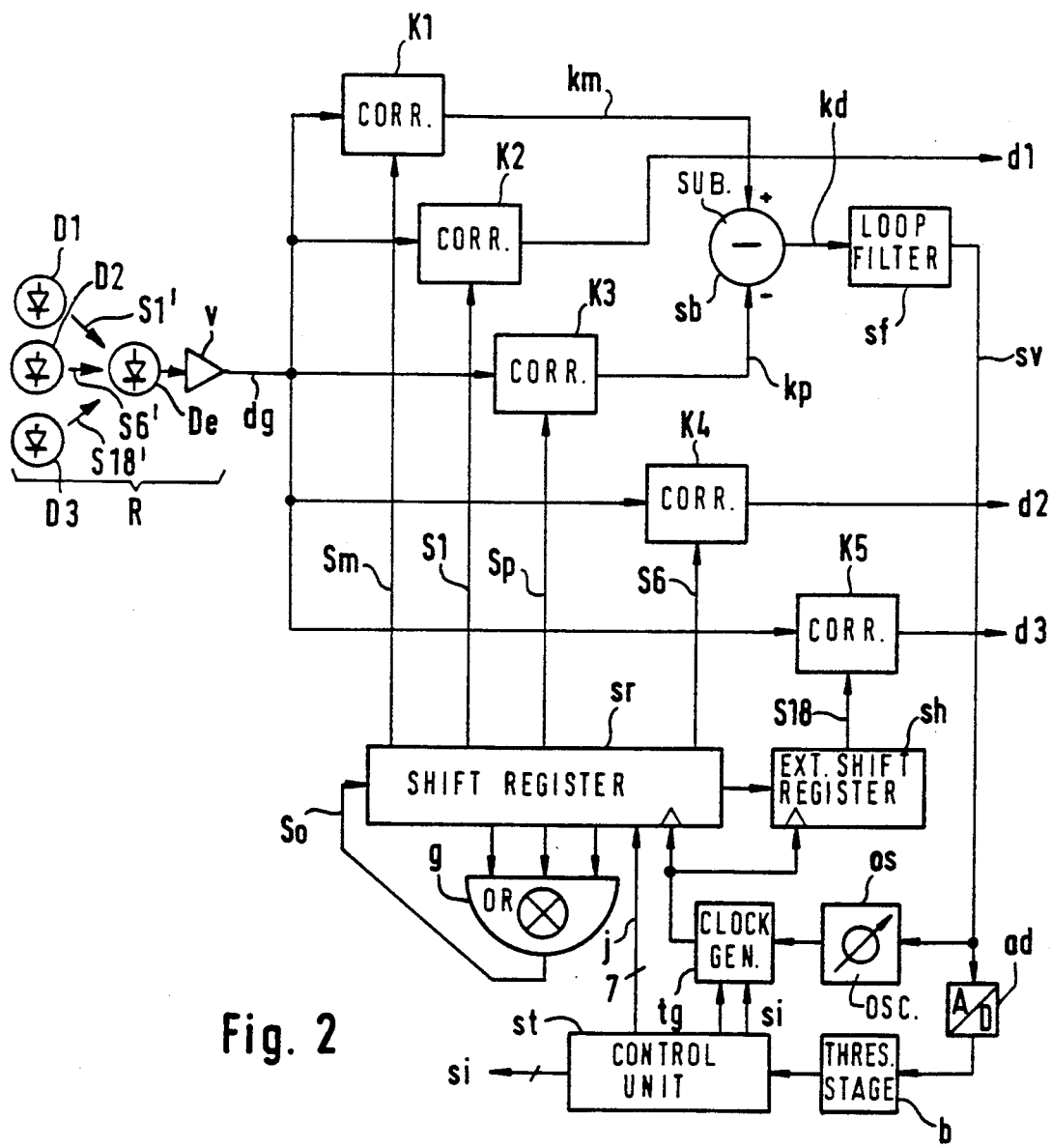
FIG. 2 is a block diagram of one embodiment of the receiver circuit during normal operation employed with this invention.

It is well known that such spread-spectrum signals can be generated by a shift register whose serial input is fed from the output of a multiple input, exclusive-OR gate. This technology is embodied by the circuitry of FIG. 2. In FIG. 2, a three-input exclusive-OR gate g has its inputs coupled to selected stages of a shift register sr. The spread-spectrum signal So is applied to the input of the shift register sr. The feedback loop between the output of the exclusive-OR gate g and the input to the shift register sr provides consecutive shift-register outputs and consecutive spread-spectrum signals. If the period of the spread-spectrum signal becomes sufficiently long, the consecutive signals will be out of phase and will not correlate with each other. Consequently, a large number of spread-spectrum signals may be made available. It should be understood that spread-spectrum signals may also be generated by other sources, such as sequential readout from a memory or other methods well known in the art.

In this example the shift register sr has seven stages. When coupled with the exclusive-OR gate g employing the feedback loop, 18 different spread-spectrum signals, having a pseudorandom sequence of 127 pulse periods, can be generated. Obviously, for a transmitter/receiver link to operate, the spread-spectrum signals at the transmitting and receiving ends must match. Consequently, the spectrum signals in the remote control transmitter will be generated in the same manner as is shown in the receiver circuitry of FIG. 2, enabling any person skilled in the art to make and use both the transmitter and receiver spread-spectrum signals.

Receiving diode De receives infrared signals S1', S6' and S18' transmitted by infrared transmitter diodes D1, D2, D3 at the receiving end of the transmission link R. The receiving diode signal is amplified by an amplifier v creating an electric composite spread-spectrum signal dg at the output. The electric composite spread-spectrum signal dg is coupled to inputs of correlators K1, K2, K3, K4, K5 which synchronize the decoder circuit with the received spread-spectrum signal dg. The detailed description of the correlators will be described in conjunction with FIG. 4.

Since the transmitting end of transmission link R outputs spread-spectrum signals S1', S6', S18', the receiver circuitry must generate corresponding reference signals S1, S6, S18 so that the signals may be properly correlated to assure communication between the transmitting and receiving ends of the link. As has been previously described, the feed back loop between the shift register sr and the exclusive-OR gate g generates the reference signals S1, S6, S18. It should be noted that in FIG. 2 the shift register sr has been expanded by an extension register sh to obtain the reference signal S18.

To synchronize the reference signals S1, S6, S18 with the transmitted spread-spectrum signals S1', S6', S18', the circuit includes a phase-locked loop having the following component modules: a phase discriminator consisting of a first and a second correlator K1, K3 and a subtracter sb, a loop filter sf, a voltage-controlled oscillator os, and a clock generator tg, whose output provides the shift clock for the shift registers sr and sh. The voltage-controlled oscillator is relatively stable in frequency and preferably employs a crystal. The lock-in range of the oscillator os is thus small. An expansion of the lock-in range, particularly in the search mode, is implemented by way of the clock generator tg. The clock generator tg inserts additional clock pulses in its output signal, and also can eliminate clock pulses, resulting in an output frequency that is adjustable within a wide range. The clock modification in the clock generator tg is caused by control signals si from a control unit st. The latter also switches from the normal mode to the search mode when the phase-locked loop is out of lock. This state is recognized by the control unit st when the discriminator signal from the subtractor output kd, and thus the output signal sv from the output of loop filter sf, is less than a predetermined value. Comparison takes place in a threshold stage b whose output is coupled to the control unit st. Since the control unit st is a digital circuit, the loop signal sv is digitized by means of an analog-to-digital converter ad. The A/D converter act can be located before or after the threshold stage b.

Figure 3A:
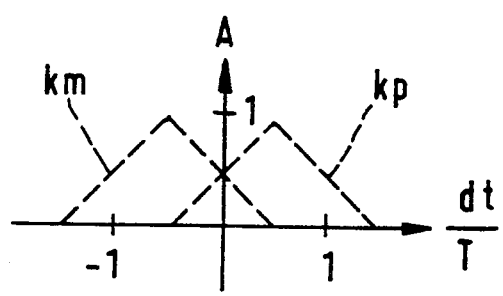
FIGS. 3a and 3b show signal diagrams for calculating the autocorrelation function and discriminator characteristic for a spread-spectrum signal.

The spread-spectrum signal S1' and the reference signal S1 produce an autocorrelation function A (FIG. 3). Referring to FIG. 3a, it is shown how the phase discriminator subcircuit K1, K3, sb makes use of the autocorrelation function A. At phase displacement $dt/t = 0$, signals with the same pseudorandom sequence correlate with each other producing an autocorrelation value $A = 1$. The autocorrelation value A decreases steadily toward both sides, reaching autocorrelation value $A = 0$ after one pulse period T. The autocorrelation value A remains at 0 for all future displacement values.

Figure 3B:
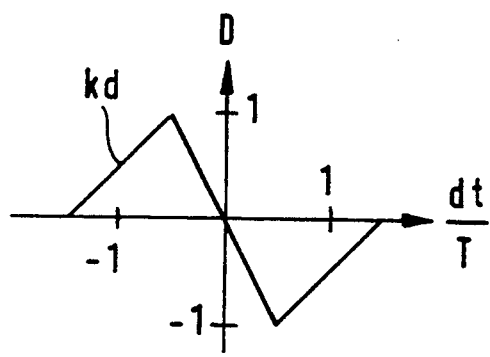

Referring to FIG. 3b and in conjunction with FIG. 2, it is apparent that one lower reference signal Sm and the upper reference signal Sp are formed by means of the shift register sr. The lower reference signal Sm and the upper reference signal Sp, lead and lag the reference signal S1 by one-half a pulse period (T/2). Together with the received spread-spectrum signal S1', the lower and upper reference signals Sm and Sp form a lower correlation signal km and an upper correlation signal kp. The values of these two correlation signals km and kp are plotted against the time displacement dt/T of the reference signal S1 in FIG. 3. By subtracting the upper correlation signal kp from the lower correlation signal km, the discriminator characteristic D is obtained. The discriminator characteristic D corresponds to the discriminator signal kd at the output of the subtractor sb, whose minuend and subtrahend inputs are supplied with the lower and upper correlation signals km and kp, respectively.

Figure 4:
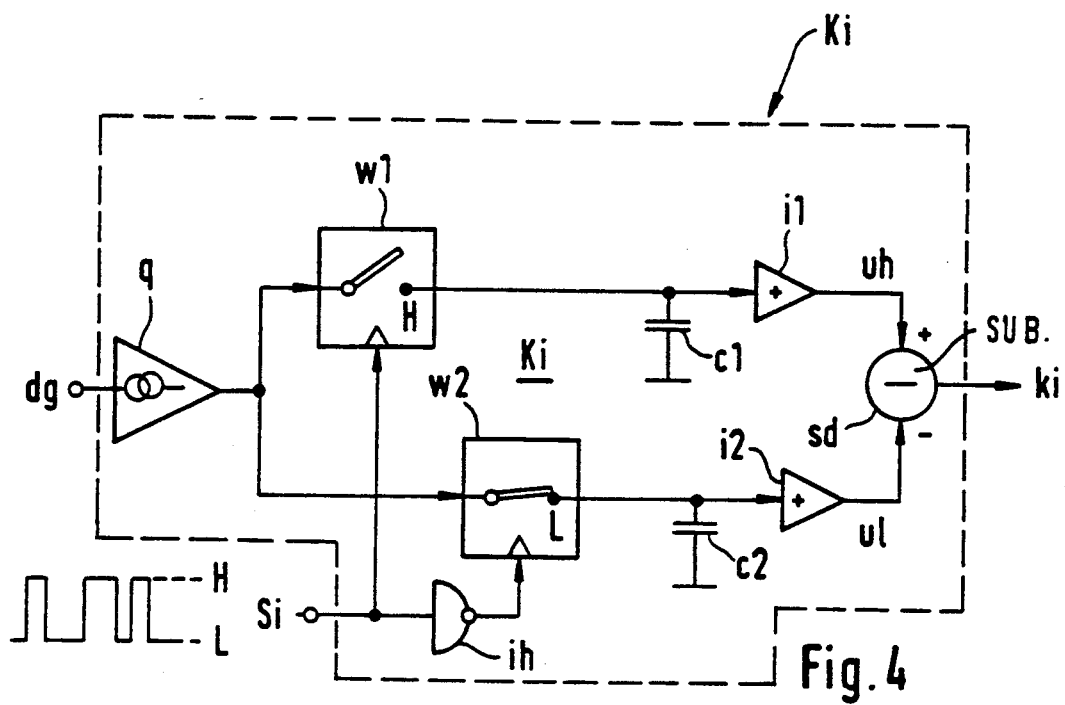
FIG. 4 shows a block diagram partially in schematic form of a correlator subcircuit which can be employed in the receiver circuit of FIG. 2.

Referring to FIG. 4, the basic operation of a correlator K1, K2, K3, K4, K5 (herein ki) is illustrated. A controlled current source q provides a current proportional to the inputted composite spread-spectrum signal dg. The proportional current is integrated by a first capacitor c1 or a second capacitor c2 depending on the logic level of a spread-spectrum reference signal Si. The current path is controlled via a first and second electronic switches w1, w2. During the H level of the spread-spectrum reference signal Si, the first capacitor c1 is connected to the output of the controlled current source q. During the L level of the spread-spectrum reference signal Si, the second capacitor c2 is connected to the output of the controlled current source q. The antiphase switching function is implemented by directly applying the spread-spectrum reference signal Si to the control input of the first electronic switch w1 and connecting the reference signal Si to the control input of the second electronic switch w2 through an inverter ih. The voltages across the first and second capacitors c1 and c2 are sensed by means of a first impedance transformer i1 and a second impedance transformer i2, respectively. The impedance transformer i1 and i2 may be FET amplifiers or other high input impedance to lower output impedance devices. The first and second impedance transformer i1, i2 operate to provide an upper signal level uh and a lower signal level ul, respectively. By the integration, all signal components which are not correlated with the spread-spectrum reference signal Si, average out. Consequently, in relation to the noise-signal component, the upper and lower signal levels increase with increasing integration time. A subtractor sd has the upper signal level uh applied to the minuend input and the lower signal level ul applied to its subtrahend input. The subtractor sd provides the desired correlator output signal ki. As a result of the subtraction, the correlator output signal ki is also free from interfering DC components of the transmission link. This is important in the case of infrared transmission links which are disturbed by natural or line-frequency-dependent ambient light.

Figure 5:
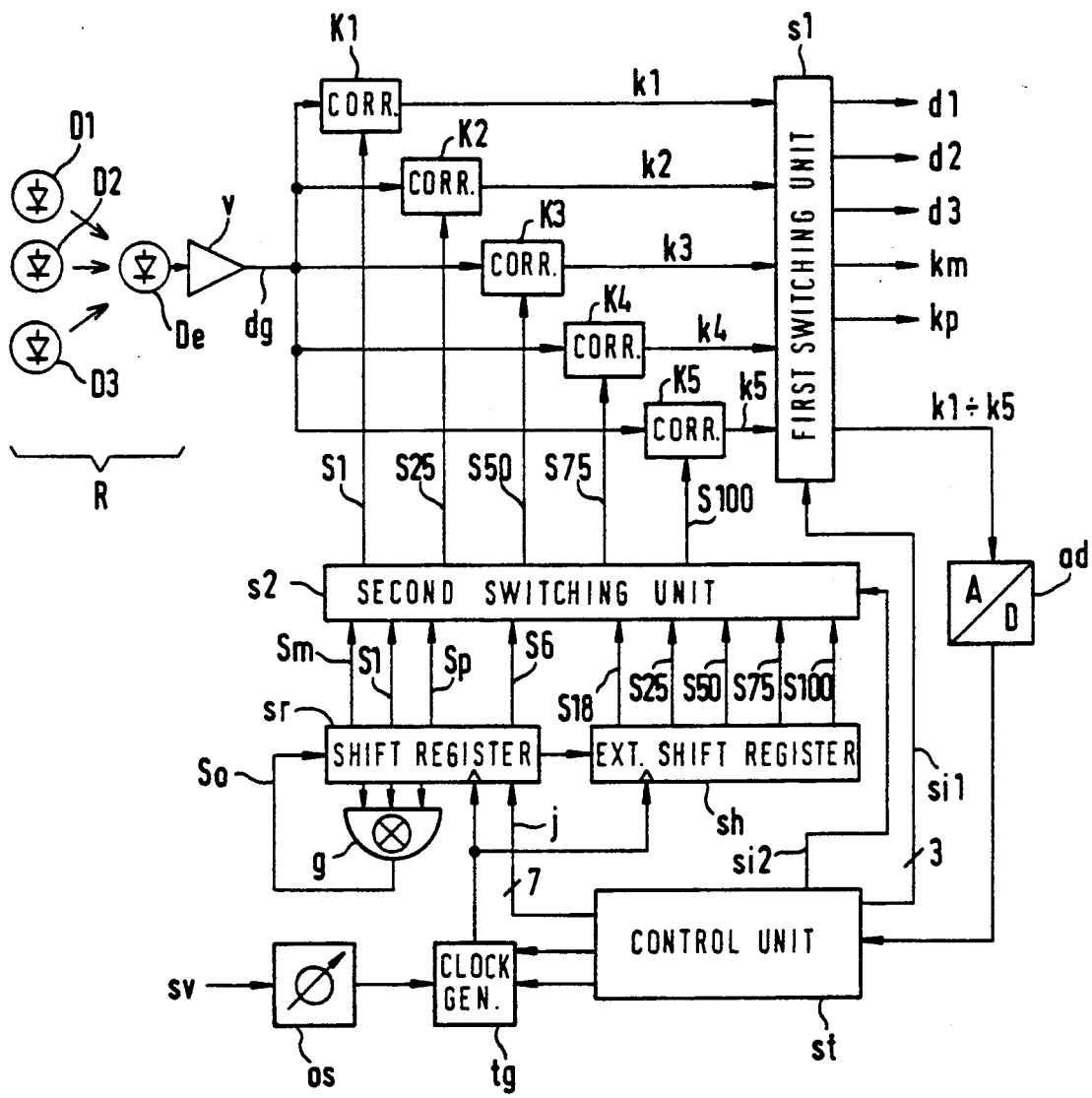
FIG. 5 is a schematic diagram of an alternative embodiment of the receiver circuit during normal operation.

FIG. 5 shows essentially the same circuit as FIG. 2. Like modules are designated by like reference characters and will not be explained again if their operation and location in the overall circuit are unchanged. The circuit of FIG. 5 differs from that of FIG. 2 in that there is added a first switching unit s1 and a second switching unit s2. For clarity, the phase-locked loop is shown only in part.

The apparatus shown in FIG. 5, permits a faster synchronization of the phase-locked loop than does the FIG. 2 circuit. When the circuit of FIG. 2 is in out-of-phase condition, the frequency of the shift-register clock must be changed step by step until the discriminator signal kd responds. Long synchronization times may result in the generation of a long pseudorandom-signal period if the shift is nearly equal to the period of the spread-spectrum signal and the direction of search is unfavorable. The search time can be halved if an auxiliary correlator is supplied with an auxiliary reference signal. The auxiliary reference signal being delayed by half the period of the spread-spectrum signal with respect to the reference signal S1. If further auxiliary correlators are inserted into the time interspaces, the search time is further reduced. This is so, since the swept search interval, until one of the auxiliary correlators responds, becomes increasingly shorter. This method is implemented in the circuit shown in FIG. 5. In addition to the five reference signals Sm, S1, Sp, S6, and S18 of FIG. 2, four auxiliary reference signals S25, S50, S75, and S100 are generated with the aid of the extension shift register sh. Together with the reference signal S1, these four auxiliary reference signals divide the entire spread-spectrum-signal period into approximately equal lengths of time.

During the search mode, the second switching unit s2 directs the reference signal S1 and the auxiliary reference signals S25, S50, S75 and S100 to the five correlators K1 to K5. The outputs of these five correlators, namely the first to the fifth correlation signals k1, k2, k3, k4, k5, are directed through the first switching unit s1. The first switching unit serves as a multiplexer to the control unit st, where their amplitudes are compared.

If, in the search mode, the output of the first correlator K1, whose control input is supplied with the reference signal S1, indicates synchronism, the control unit st will immediately switch from the search mode to the normal mode as in FIG. 2. Then, the second switching unit 2 connects the five correlators K1, K2, K3, K4, K5 to the lower reference signal Sm, the reference signal S1, the upper reference signal Sp, the reference signal S6, and the reference signal S18, respectively. Simultaneously with the switching of the second switching unit s2, via a control command si2, the control unit st switches the first switching unit s1, via an additional control command si1. The switching causes the outputs of the five correlators K1 to K5 to be removed from the control unit st. The first switching unit s1 operates in both the multiplex mode and the stationary mode. It provides the first, second and third diode signals d1, d2 and d3. The first switching unit si also provides the lower and upper correlation signals km and kp, to the discriminator.

If, in the search mode, one of the correlators K2 to K5, which are controlled by the auxiliary reference signals, indicates synchronism, the control unit st will reprogram the shift register sr via a multibit bus j (seven). The four possible data records are stored in a memory of the control unit st. By the readjustment of the shift register sr, a "temporal correction" of the reference signal S1 is performed. The temporal correction corresponding to the distance between the reference signal S1 and the synchronism-indicating auxiliary reference signal.

Figure 6A:
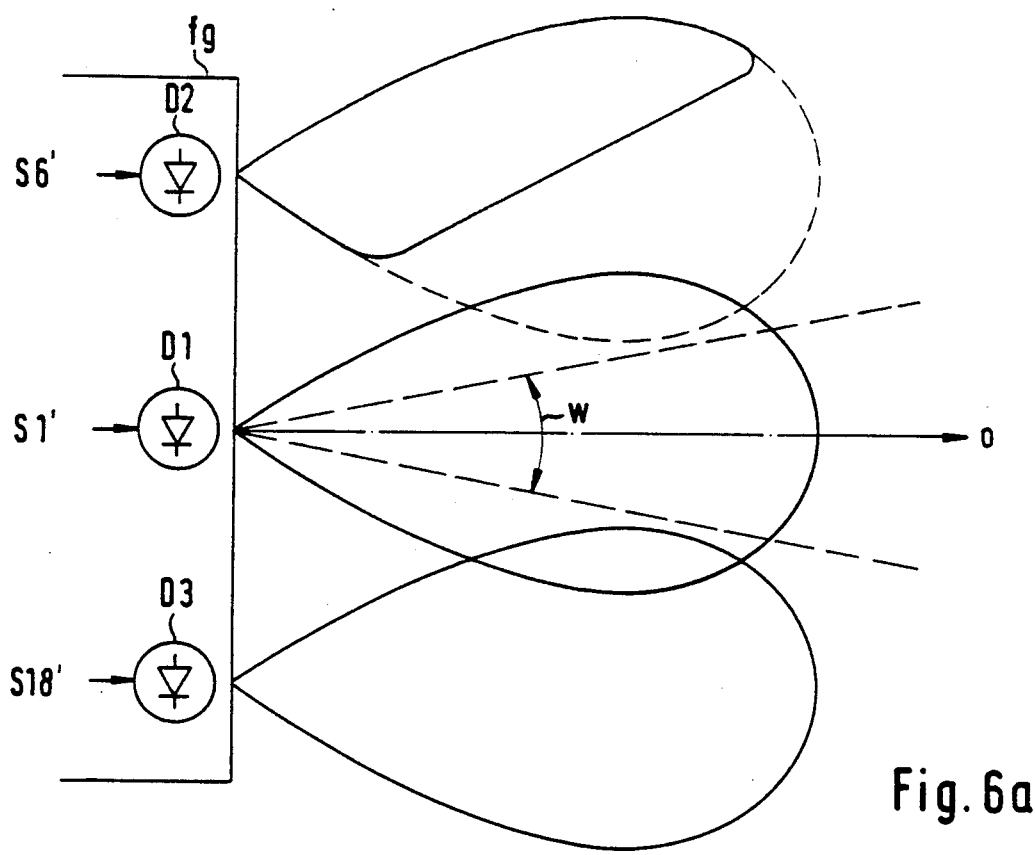
FIGS. 6a and 6b show respective horizontal and vertical views of the electrooptical transmitting device and radiation patterns.

FIG. 6a is a schematic horizontal view of the arrangement of three transmitter diodes D1, D2 and D3 in a remote-control transmitter fg together with their radiation lobes and associated spread-spectrum signals S1', S6' and S18'. The radiation lobes of the first and third diodes D1 and D3 have an approximately uniform intensity distribution in an angular range w which includes the direction of the optical axis. By contrast, the radiation lobe of the second diode D2 shows a gross monotonic intensity variation in the horizontal angular range w. Thus, a horizontal movement of the remote-control transmitter fg will hardly cause change in the intensities of the received spread-spectrum signals S1' and S18' from the first and third diodes D1 and D3, while that of the signal from the second diode D2 will change.

Figure 6B:
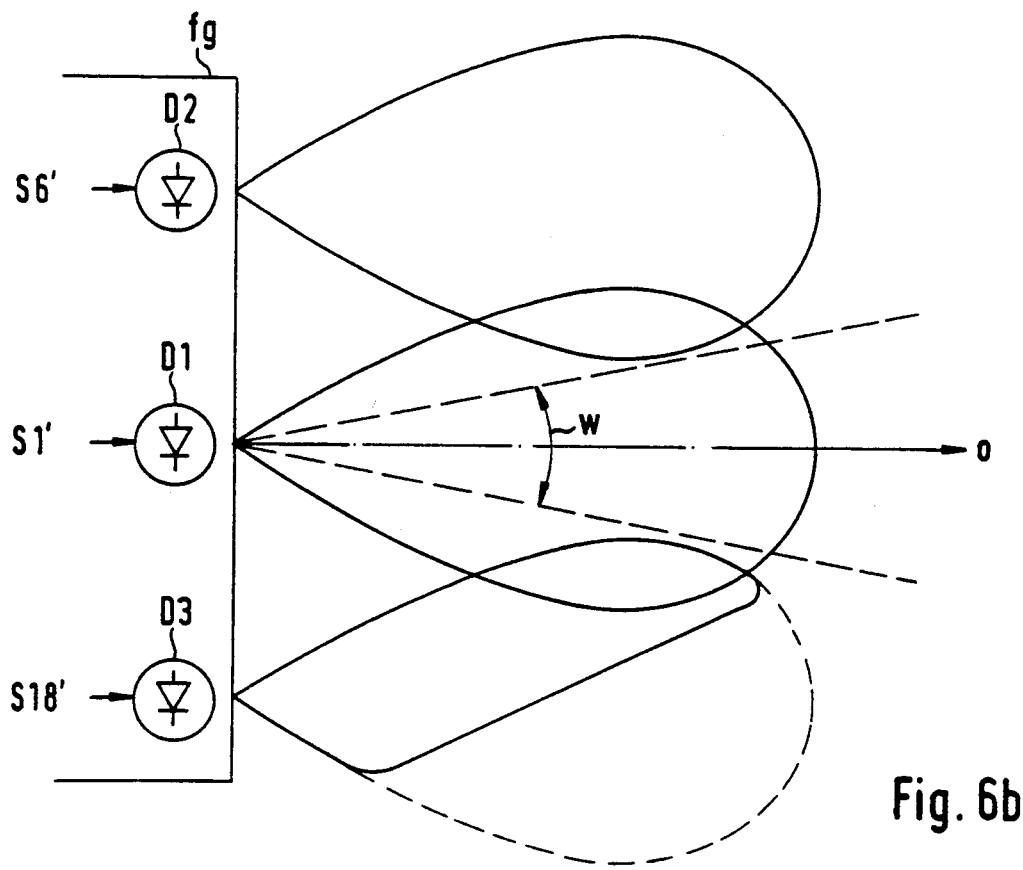

FIG. 6b shows, for the same remote-control transmitter fg the intensity distributions of the three radiation lobes in a schematic vertical view. In the direction of the vertical angular range w, there is hardly any change in the intensities of the radiation lobes of the first and second diodes D1 and D2, while the radiation lobe of the third diode D3 shows a gross monotonic intensity variation in the vertical angular range w. Thus, a vertical movement of the remote-control transmitter fg will influence particularly the received intensities of the spread-spectrum signal S18'. The radiation lobe of the first diode D1, which is approximately uniform in the horizontal and vertical directions, serves as a reference quantity for the transmission link. Thus, the first diode signal d1, irrespective of the position of the remote-control transmitter, has an approximately constant level which is used in a subsequent evaluating circuit as a reference quantity for the second and third diode signals d2 and d3.

We claim:

1. An electrooptical transmission link apparatus having a transmitter end and a receiver end for the remote-control transfer of spread-spectrum command signals, said transmission link apparatus comprising:

a first generating means at said transmitter end for generating a plurality of spread-spectrum signals, wherein each one of said plurality of spread-spectrum signals has an identical data sequence shifted by a predetermined amount to be out of phase with a preceding and a subsequent one of said plurality of spread-spectrum signals;

an optical transmitter means at said transmitter end for transmitting said plurality of spread-spectrum signals;

an optical receiver means at said receiver end for receiving said spread-spectrum signals from said transmitter end;

a second generating means at said receiver end for generating a plurality of reference signals, said reference signals being synchronous with said plurality of spread-spectrum signals;

correlation means at said receiver end for separating said plurality of spread-spectrum signals into individual component signals to determine the respective signal strengths of the individual component signals; and synchronizing means at said transmitter and receiver ends for synchronizing corresponding spread-spectrum signals and reference signals.

2. The apparatus according to claim 1, wherein said first generating means includes a shift register for receiving a spread signal at an input, said register having a plurality of stages each having a output for providing a spread spectrum signal with said register stages providing said plurality of spread-spectrum signals said shift register responsive to a given clock rate to provide shift pulses.

3. The apparatus according to claim 2, wherein said second generating means includes a shift register having multiple stages, each one of said stages having an output tap through which a single one of said plurality of reference signals is supplied, said shift register responsive to a predetermined clock rate.

4. The apparatus according to claim 3, wherein said predetermined clock rate of said second generating means is equal to said predetermined clock rate of said first generating means.

5. The apparatus according to claim 1, wherein said correlation means includes a plurality of correlators, each one of said correlators having an input, a control input and an output, each one of said plurality of correlators receiving at said input said plurality of spread-spectrum signals from said first generating means and receiving at said control input a signal one of said plurality of reference signals from said second generating means, said output of each one of said correlators providing the integrated signal strength of the signal spread-spectrum signal corresponding to one of said plurality of reference signals.

6. The apparatus according to claim 5, wherein said integrated signal strength is output as a diode signal.

7. The apparatus to claim 1, wherein said synchronizing means includes a phase-locked loop circuit including a phase discriminator, a loop filter, a voltage controlled oscillator and a clock generator, wherein said clock generator determines the data rate of said plurality of reference signals.

8. The apparatus according to claim 7, wherein said synchronizing means further includes a control unit, said control unit varying the number of clock pulses generated by said clock generator when phase deviations occur which are not detected by said phase discriminator.

9. The apparatus according to claim 8, wherein said second generating means includes a first shift register and an extension shift register, said shift register generating a first reference signal and said extension shift register generating a plurality of auxiliary reference signals whose temporal reference points operate to divide the spread-spectrum signal period into substantially equal time intervals, said first reference signal and each said plurality of auxiliary reference signals being applied to a correlator whose signal inputs are supplied by said plurality of spread-spectrum signals, the control inputs for said correlator are supplied by said first reference signal and one auxiliary reference signal, the outputs from said correlator are fed to said control unit as correlation signals, said control unit terminating its search mode when at least one of the correlation signals indicates a phase deviation that initiates a temporal correction of the first reference signal, said temporal correction being equal to the delay of the auxiliary reference signal, causing the deviating correlation signal, with respect to said first reference signal.

10. The apparatus according to claim 9, wherein said second generating means includes a shift register and an exclusive-OR gate, said shift register being controlled by said clock generator and having its input coupled to the output of said exclusive-OR gate, the inputs of said exclusive-OR gate being coupled to the individual stages of said shift register wherein the stages of said shift register are adjustable by the control unit via a bus.

11. The apparatus according to claim 9, wherein the outputs of the correlators are coupled to a first switching unit which transfers the outputs of said correlator to the control unit when 1n a search mode; a second switching unit, positioned between the correlators and the second generating means and operative to perform switching from reference signals.

12. The apparatus according to claim 11, wherein said first switching unit operates in a multiplex mode.

13. The apparatus according to claim 9, wherein a first switching means is coupled to the outputs of the correlators for switching the outputs of said correlators the control unit when in a search mode; a second switching unit positioned between the correlators and said second generating means to enable switching from reference signals to auxiliary reference signals when in a search mode, said first and second switching units being controlled by said control unit.

14. The apparatus according to claim 9, wherein said transmitter at said transmitter end transmits spread-spectrum signals with spatially different radiation lobes via at least three optoelectric transmitting diodes, the radiation lobe of the first transmitting diode serving as a reference quantity, the radiation lobes of the second and third transmitting diodes, in the horizontal and vertical directions respectively, varying in intensity monotonically in comparison with said reference quantity within a predetermined angular range, and at the receiving end, the angular dimensions in the horizontal and vertical directions, between the optical axis of the first transmitting diode and the line joining the transmitter end and the receiver end, are determined via the associated output of the correlators.

15. The apparatus according to claim 14, wherein said radiation lobes of said second and third transmitting diodes, in the horizontal and vertical directions respectively, increase in intensity in comparison with said reference quantity.

16. The apparatus according to claim 14, wherein said radiation lobes of said second and third transmitting diodes, in the horizontal and vertical directions respectively, decrease in intensity monotonically in comparison with said reference quantity.

17. The apparatus according to claim 8, wherein said control unit causes said clock generator to increase its clock rate by adding pulses.

18. The apparatus according to claim 8, wherein said control unit causes said clock generator to decrease its clock rate by omitting pulses.

19. The apparatus according to claim 7, wherein said phase discriminator contains a first correlator, a second correlator and a subtractor, the control input of said first correlator is fed by a lower reference signal which leads the desired phase of a reference signal by half a data pulse period, the control input of said second correlator being fed with an upper reference signal which lags the desired phase of said reference signal by half a data pulse period, the outputs of the first and second correlators being connected to the minuend and subtrahend inputs, respectively, of the subtractor, the subtractor output forming the discriminator signal for the phase-locked loop.

* * * * *